United States Patent [19]

Smith et al.

[11] 4,273,257
[45] Jun. 16, 1981

[54] JAR MOUNTED PIPETTOR

[75] Inventors: James C. Smith, Hayward; Richard D. Reed, Sonoma, both of Calif.

[73] Assignee: Sherwood Medical Industries Inc., St. Louis, Mo.

[21] Appl. No.: 816,853

[22] Filed: Jul. 18, 1977

[51] Int. Cl.³ .............................................. G01F 11/02
[52] U.S. Cl. ........................................ 222/43; 222/44; 222/309; 222/384
[58] Field of Search .................... 222/41, 43, 44, 46, 222/47, 309, 384, 49, 50; 73/425.6, 424.4 P

[56] References Cited

U.S. PATENT DOCUMENTS

| | | | |
|---|---|---|---|
| 2,096,461 | 10/1937 | Mane et al. | 222/43 |
| 3,141,583 | 7/1964 | Mapel et al. | 222/49 X |
| 3,232,117 | 2/1966 | Gilmont | 73/425.6 |
| 3,273,763 | 9/1966 | Gilmont | 222/41 X |
| 3,283,727 | 11/1966 | Rodrigues | 222/309 X |
| 3,327,900 | 6/1967 | Goda | 222/43 |
| 3,430,813 | 3/1969 | Gilmont | 222/43 |
| 3,452,901 | 7/1969 | Roach | 222/49 |
| 3,527,551 | 9/1970 | Kutik et al. | 222/384 X |
| 3,574,334 | 4/1971 | Roach | 222/385 |
| 3,729,022 | 4/1973 | Roach | 222/383 X |
| 3,940,027 | 2/1976 | Marterer | 222/309 |
| 3,982,899 | 9/1976 | Kelm | 73/425.6 X |
| 3,987,934 | 10/1976 | Reed et al. | 222/43 |
| 4,072,247 | 2/1978 | Yamazaki | 73/425.4 P |
| 4,096,750 | 6/1978 | Sturm | 73/425.6 |
| 4,096,751 | 6/1978 | Withers et al. | 73/425.6 |
| 4,098,432 | 7/1978 | Oosterling et al. | 222/44 X |

FOREIGN PATENT DOCUMENTS 1632032 8/1970 Fed. Rep. of Germany ........... 222/309

Primary Examiner—Robert J. Spar
Assistant Examiner—Frederick R. Handren
Attorney, Agent, or Firm—Limbach, Limbach & Sutton

[57] ABSTRACT

A pipettor for threaded attachment to a liquid containing jar provides for dispensing a controllable volume of liquid with a high degree of precision upon manually operating a plunger. The liquid volume dispensed in a single plunger operation is adjusted by rotation of the plunger knob. Both a linear coarse scale and a circular fine adjustment scale are provided for accurately setting the volume to be dispensed. Positive detent stops are provided for accurate volume settings. Improved air purging and plunger locking mechanisms are also provided.

4 Claims, 8 Drawing Figures

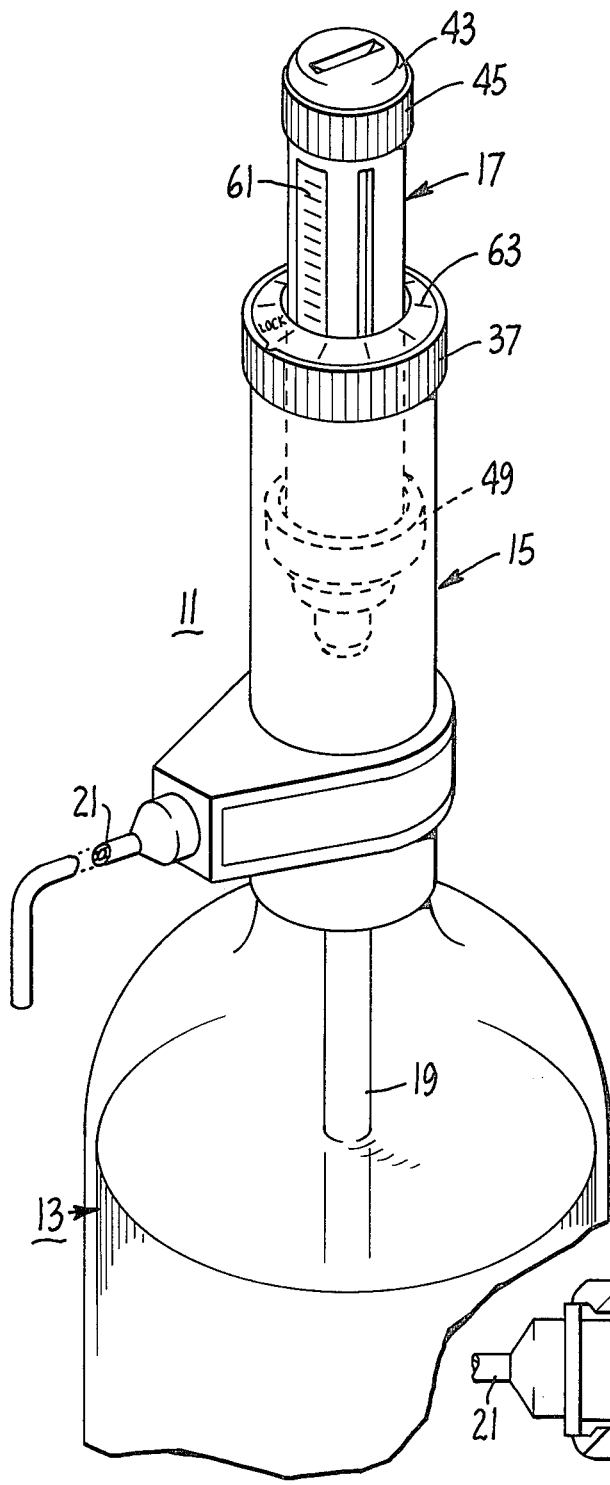
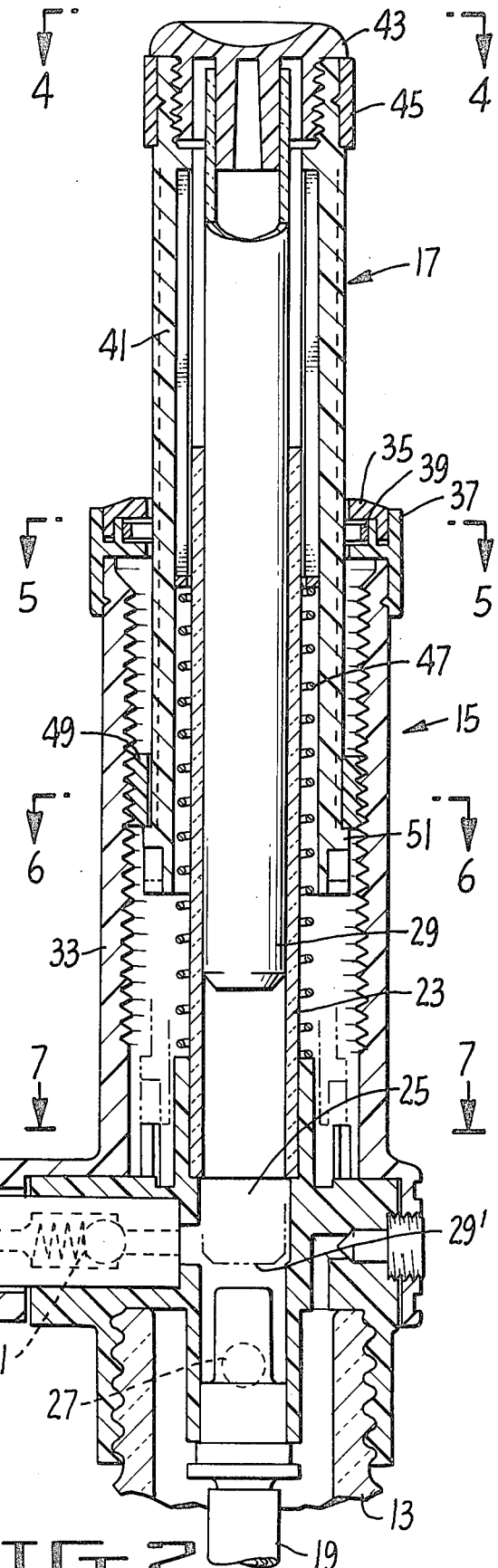
FIG.1.
FIG.2.

JAR MOUNTED PIPETTOR

BACKGROUND OF THE INVENTION

This invention relates generally to the art of pipetting precise volumes of liquid, and more particularly to improvements in jar mounted liquid pipettors.

In chemical laboratories, especially medical and clinical laboratories, it is common for frequently used liquid chemicals to be dispensed from the glass bottles in which they are supplied by a pipettor that is threadedly attached to the neck of such a bottle. Examples of commercially available jar mounted pipettors manufactured and sold by Oxford Laboratories Inc., the assignee of the present application, are described in its U.S. Pat. Nos. 3,452,901; 3,574,334; 3,729,022; and 3,987,934.

It is a principal object of the present invention to provide a pipettor of this type having an improved volume setting mechanism with an even greater degree of accuracy, reliability and operator convenience.

It is another object of the present invention to provide a convenient locking mechanism for the pipettor for storage and shipment.

It is a further object of the present invention to provide a pipettor structure which more easily permits purging of air therefrom.

SUMMARY OF THE INVENTION

These and additional objects are accomplished by the various aspects of the present invention wherein a jar mounted pipettor includes a body that is attached to the jar and a plunger assembly operable from one end thereof which contains a coarse volume setting scale attached to the outside which is read at the end of the pipettor body. A fine adjustment circular scale is provided about the protruding plunger assembly portion at the top surface end of the pipettor body. Adjustment of the liquid volume dispensed upon a single stroke of the plunger assembly is controlled by rotating the protruding portion of the plunger assembly. This causes the beginning position of the plunger assembly with respect to the pipettor body to be changed, thus altering the volume of liquid that will be dispensed. The volume reading taken from the coarse and fine volume scales reflects this change. A detent mechanism is provided internal of the pipettor body between it and the plunger assembly in order to provide a plurality of rotatable stops that may be overcome by the operator but which does permit the operator to stop the volume adjustment exactly at one of a predetermined plurality of positions. The detents also assure that the volume setting is not accidently changed during a liquid dispensing operation of the device.

This only briefly summarizes the main features of the improved pipettor according to the present invention. Additional features, advantages and objects of the present invention are provided in the following description of its preferred embodiments which should be taken in conjunction with the accompanying drawings.

BRIEF DESCRIPTION OF THE DRAWINGS

FIG. 1 illustrates a preferred embodiment of a liquid dispenser embodying the various aspects of the present invention;

FIG. 2 is a cross sectional view of the dispenser of FIG. 1;

DESCRIPTION OF A PREFERRED EMBODIMENT

Figure 3:
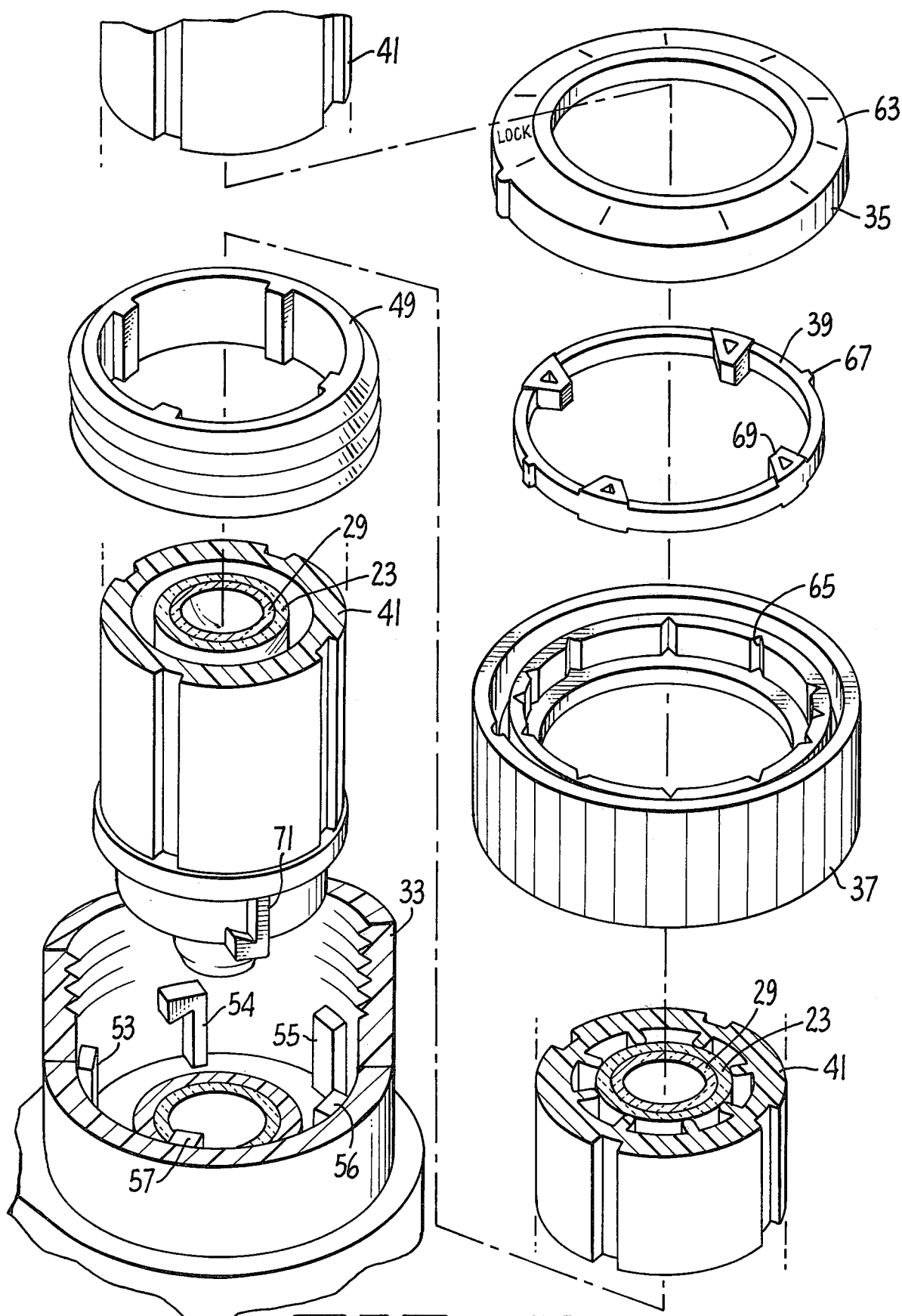
FIG. 3 is an exploded view of portions of the assembly of the liquid dispenser according to FIGS. 1 and 2.
Figure 4:
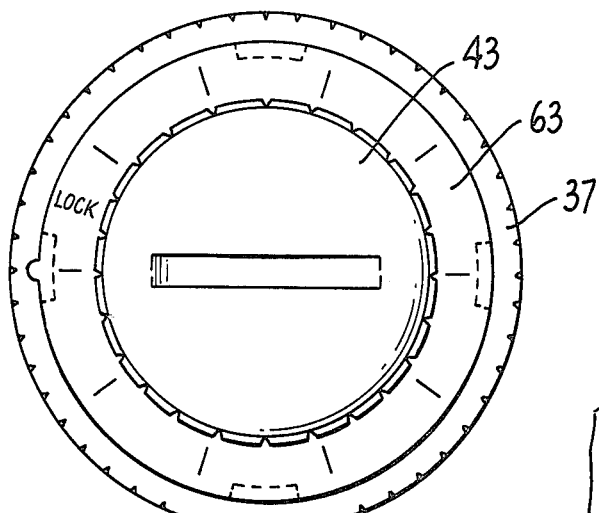
FIG. 4 is a top view of the dispenser of FIGS. 1-3 as viewed from a position indicated by section 4—4 of FIG. 2.

Referring initially to FIG. 1, a dispenser 11 is shown to be threadedly attached at its lower most end to the neck of a bottle 13 from which liquid is desired to be dispensed. The dispenser 11 is formed of two major components: the first is a dispenser body assembly 15 which is held stationary with respect to the bottle 13; the second major portion is a plunger assembly 17 which reciprocates back and forth within the pump body 15 to pump liquid therefrom. The liquid is drawn into the dispenser 11 by an inlet tube 19 that extends downward into the liquid within the bottle 13. This liquid is drawn up in response to a pumping action provided by the plunger assembly 17 being permitted to move upwards to return to its normal upright rest position shown in FIG. 1. That liquid is then discharged through an outlet tube 21 upon depressing the plunger assembly 17 downward into the dispenser body assembly 15. The dispenser 11 includes the structure which permits fine adjustment of the liquid volume to be dispensed upon one operation of the plunger assembly 17 for high precision operation.

Referring to the detailed drawings of FIGS. 2-7, the structure and operation of the instrument will be explained. The dispenser assembly 15 includes therein as a principal component a cylindrical plunger barrel 23 with its lower most end opening into a liquid passage 25 within a base portion of the dispenser body. Liquid is communicated from the bottle through the inlet 19 into the chamber 25 through a valve 27. The valve 27 opens when a cylindrical plunger 29 is withdrawn (move upwards) within the plunger barrel 23. The liquid outlet 21 also communicates with the passage 25 through a spring loaded outlet valve 31 that opens to permit liquid to discharge through the outlet tube 21 in response to the plunger 29 being moved downward within plunger barrel 23. During liquid intake, the outlet valve 31 remains closed and during liquid discharge, the inlet valve 27 remains closed.

A cylindrically shaped shroud 33 provides the outer encasement of the upper portion of the dispenser body 15. At its top are attached a calibrated cap top 35 and a calibrated cap base 37. Between these two elements is a detent ring 39.

The plunger assembly 17 is formed principally of an encasement 41 and the plunger 29. These two elements are connected together through a plunger cap 43. A plunger collar 45 is also attached to the upper end of the plunger encasement 41. The encasement 41 fits within a cooperatively shaped and sized opening within the cap top 35. It includes an inner ledge to provide a surface to contact an upper end of a spring 47 that is held in compression between the plunger encasement 41 and the dispenser body 15. Thus, the plunger assembly 17 is normally urged upward.

Figure 6:
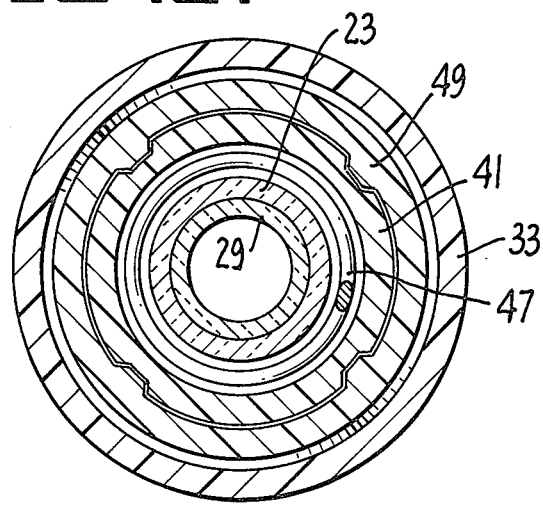
Figure 7:
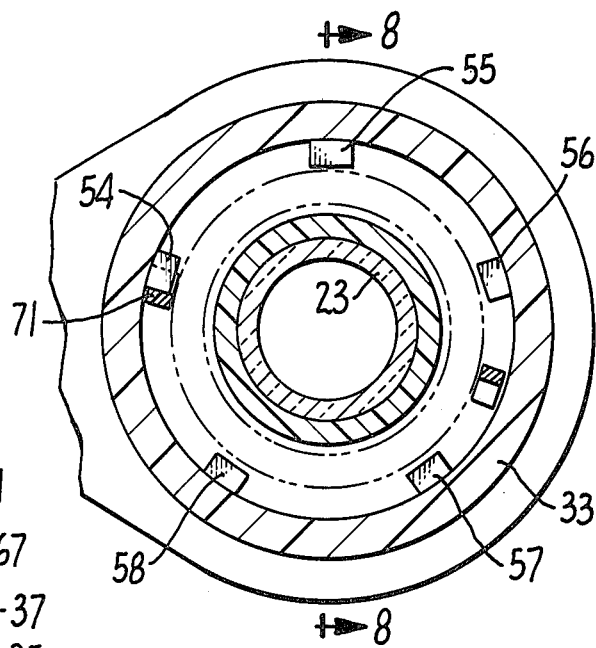

The upward rest position of the plunger assembly 17 is determined by the position of an adjustment nut 49. The nut 49 is threaded on its outside surface for engaging threads on the inside surface of the shroud 33. As best shown in FIG. 6, the nut 49 is keyed to the outside of the plunger encasement 41 so that the nut is rotated in response to rotation of the plunger assembly 17. But the key connection between the plunger encasement 41 and the internal surface of the nut 49 also permits the plunger assembly 17 to be freely reciprocated up and down. The underside of the nut 49 serves as an upper stop against which abuts an upper surface of a flange 51 that is part of the lower portion of the plunger encasement 41.

The lower stop defining the maximum distance that the plunger assembly 17 can be depressed into the dispenser body 15 is fixed. That abuttment is provided by a series of stops 53 through 57 against which the lower surface of the plunger encasement 41 abuts when the plunger assembly 17 is fully depressed.

The volume of liquid that is discharged through the outlet 21 upon any given depression of the plunger assembly 17 from its rest position to its maximum depressed position is thus determined by the position of the nut 49 which is controlled by rotating from the top the plunger assembly 17. Referring again to FIG. 1, a rough volume scale 61 is provided along the outside of the plunger encasement 41 in a vertical line along its length. This volume indicator is read by its intersection with the adjacent top surface of the calibrated cap top 35. On that same surface is provided a circular scale 63 having a plurality of markings therearound for different volume intervals. The fine adjustment scale 63 is read by the alignment of the scale 61 therewith. Of course, each of the volume markings on the two scales contain numbers indicative of the volume setting of the instrument but these numbers have been omitted from the drawing for simplicity.

The spacings of the markings on the vertical scale 61 are such that the indication moves from one mark to the next adjacent mark upon the single full revolution of the plunger assembly 17 with respect to the dispenser body 15. This volume increment is determined by the pitch of the threads on the nut 49 and the inside of the shroud 33. The markings and volume figures on the fine adjustment circular scale 63 subdivide the volume between adjacent marks on the scale 61 into finer increments. It is most convenient to provide ten such marks and subdivisions in the circular scale 63 so that whatever interval is provided in the vertical scale 61 between adjacent marks, that interval is further broken down into tenths.

Figure 5:
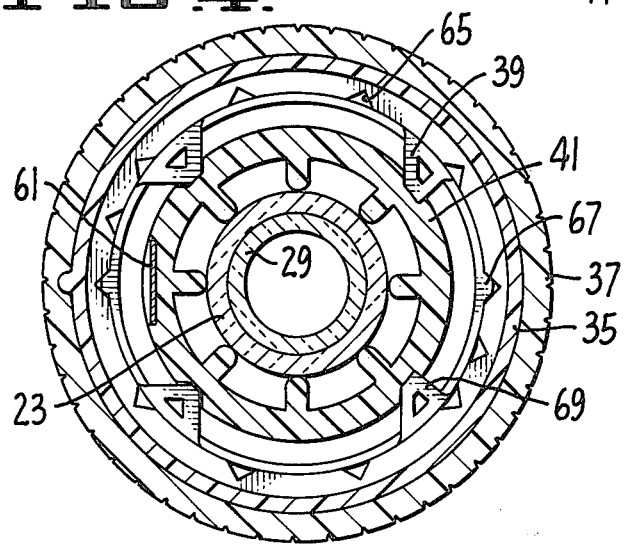
FIGS. 5, 6 and 7 are cross sectional views of the dispenser of FIGS. 1-3 taken, respectively, at sections 5—5, 6—6 and 7—7 of FIG. 2.

Referring particularly to FIGS. 3 and 5, the detent ring 39 is seen to hold the rotatable position of the plunger assembly 17 at one of the marks of the circular scale 63 but while still permitting the plunger assembly 17 to be operated. Ten indentations, such as the indentation 65 are provided on an inside surface of the calibrated cap base 37, the same number as the number of distinct volume setting marks on the fine adjustment scale 63. One or more projections 67 are provided on the outside of the detent ring 39 for engagement by these slots. The detent ring includes four internally extending projections, such as the projection 69, which are provided to engage four longitudinally extending slots on the outside surface of the plunger encasement. This provides a rotatable connection between the plunger assembly and the detent ring 39 but at the same time permits the plunger to be operated back and forth while the detent ring remains captured by the dispenser body. The four outside plunger encasement slots are the same ones that engage the inner projections of the nut 49 that is shown in FIG. 6. The flexible nature of the thin detent ring 39 makes it easy to disengage the projection 67 therefrom by rotating the plunger assembly 17 with enough force. The result is that as the plunger assembly 17 is rotated there is felt a firm click each time that the projection 67 falls into one of the ten recesses 65. The parts are oriented so that the scale 61 is stopped opposite one of the marks of the scale 63 every time this detent engagement occurs with one of the ten recesses 65.

Figure 8:
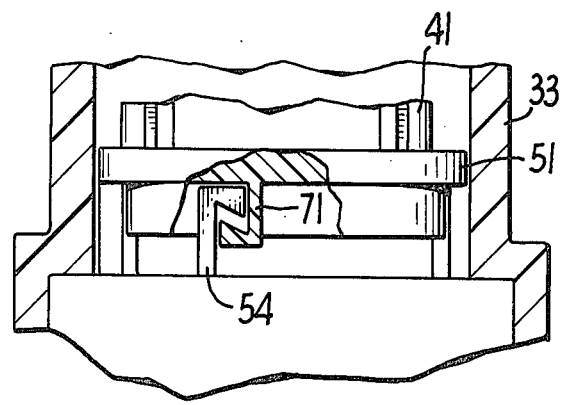
FIG. 8 is a partially sectional and broken away view of the lower portion of the dispenser of FIGS. 1-7 taken at section 8—8 of FIG. 7.

Another marking is provided on the scale 63 for a "lock." This refers to a rotatable position of the plunger 17 that permits it to be depressed a maximum amount into the dispenser body 15 and locked in such a position against the force of the spring 47. This locking mechanism is highly desirable for shipping or storing the instrument since it does make it much shorter. Referring principally to FIG. 8, it will be noted that the stop post 54 includes a hook that is cooperatively shaped with that of a downwardly extending hook 71 from the bottom of the plunger encasement 41. It can be seen that as the plunger assembly 17 is fully depressed and rotated clockwise, the two hooks 54 and 71 will engage one another to prevent the spring 47 from pushing the plunger assembly 17 outward as it normally does.

Referring principally to FIG. 2, it will be seen from the dotted outline 29' that is representative of the lower most position of the piston 29, that the piston extends to the lower edge of the outlet opening into the chamber 25. Present pipettors do not extend the piston 29' down so far but rather would limit its travel to the bottom of the plunger barrel 23. It has been found that by permitting the plunger to extend the further distance downward, as shown in FIG. 2, that it is much easier to purge air from the instrument when it is first employed after not having liquid in it.

Although the various aspects of the present invention have been described with respect to a preferred embodiment, it will be understood that the invention is entitled to protection within the full scope of the appended claims.

It is claimed:
1. A pipettor, comprising:
a dispensor body including a plunger chamber as part of a structure with its lower portion adapted to be fastened onto a bottle top,
a plunger assembly operable for reciprocating a plunger back and forth within said plunger chamber, said plunger assembly terminating in an end extending outward of the top of said dispenser body,
valve means for permitting liquid to be drawn from the bottle into the plunger chamber upon movement of said plunger assembly in a direction outward of the top dispenser body end and to discharge liquid therefrom in response to movement of said plunger assembly in a direction into the dispenser body, the volume of liquid so discharged depending upon the length of the plunger's downward stroke,
means for providing a fixed maximum position that said plunger assembly can be pushed into said dispenser body, resilient means within said dispenser body for urging said plunger assembly to a rest position outward of the dispenser body, means responsive to rotation of said plunger assembly for controlling the permissible stroke length by adjusting the rest position of said plunger assembly, thereby to provide control of the volume of liquid discharged in one reciprocation of said plunger, a vertical liquid volume scale provided in a straight line along the length of said plunger assembly that protrudes from the end of said dispenser body, thereby to provide while the plunger is in its rest position a coarse reading of the vertical scale against a top surface of the plunger body to determine the liquid volume that is to be discharged upon full depression of the plunger assembly, said vertical scale containing major makings along its length that are spaced apart a distance equal to that which the rest position of the plunger moves in response to one revolution of the plunger, a circular scale provided around said top surface of said dispenser body surrounding said protruding end of the plunger assembly, the markings of the circular scale being calibrated to be read at the intersection with the vertical scale, whereby a combination of the readings from both scales provides fine and coarse adjustments of the piston stroke length, positive detent means within said dispenser body for establishing a plurality of stable rotatable positions of the plunger, said stable positions being overcome by enough hand force to rotate said plunger assembly to a new volume setting when desired, and locking means provided within a lower portion of said dispenser body independent of said rest position controlling means for engaging a lower extremity of said plunger near its fixed maximum position against the force of said resilient means upon depression of said plunger against said maximum position means and rotating said plunger to a predetermined rotatable position.

2. The pipettor according to claim 1 wherein said predetermined rotatable locked position is marked on said circular scale.

3. A pipettor, comprising:

a dispenser body including a plunger chamber as part of a structure with its lower portion adapted to be fastened onto a bottle top, a plunger assembly operable for reciprocating a plunger back and forth within said plunger chamber, said plunger assembly terminating in an end extending outward of the top of said dispenser body, valve means for permitting liquid to be drawn from the bottle into the plunger chamber upon movement of said plunger assembly in a direction outward of the top dispenser body end and to discharge liquid therefrom in response to movement of said plunger assembly in a direction into the dispenser body, the volume of liquid so discharged depending upon the length of the plunger's downward stroke, means for providing a fixed maximum position that said plunger assembly can be pushed into said dispenser body, resilient means within said dispenser body for urging said plunger assembly to a rest position outward of the dispenser body, means responsive to rotation of said plunger assembly for continuously controlling the permissible stroke length by adjusting the rest position of said plunger assembly, thereby to provide control of the volume of liquid discharged in one reciprocation of said plunger, a vertical liquid volume scale provided on the outside surface of the plunger assembly in a line oriented along its length and in the area thereof that is capable of protruding from the end of said dispenser body, thereby to provide a coarse reading of the liquid volume that is discharged upon full depression of the plunger assembly, the major markings on said coarse scale being spaced apart a distance equal to that which the plunger assembly advances in one revolution, said scale being read by its intersection with a top surface of the dispenser body, a circular scale provided around said top dispenser body surface and surrounding said protruding end of the plunger assembly, said circular scale having a given number of equally spaced major volume markings, said circular scale being read upon its intersection with said vertical scale, whereby a combination of the readings from both scales provides fine and coarse adjustment of the piston stroke length, and positive detent means within said dispenser body for establishing a plurality of stable rotatable positions of the plunger equal to said given number, said positive detent means oriented so that at each stable position said vertical scale is opposite a major marking of said circular scale, said stable positions being overcome by enough hand force to rotate said plunger assembly to a new volume setting when desired.

4. The pipettor according to claim 3 wherein said valve means includes a vertical intake passage extending from the bottom of the plunger chamber and a horizontal outlet passage extending from a side of said plunger chamber a distance above its bottom, and further wherein said maximum position means is chosen to result in a bottom of said plunger to lie at a bottom edge of said outlet passage when the plunger assembly is depressed a maximum amount into the dispenser body.

* * * * *